Feb. 6, 1945.   L. H. RYKKEN   2,368,617
LOW PRESSURE TIRE ALARM
Filed April 1, 1942   2 Sheets-Sheet 2

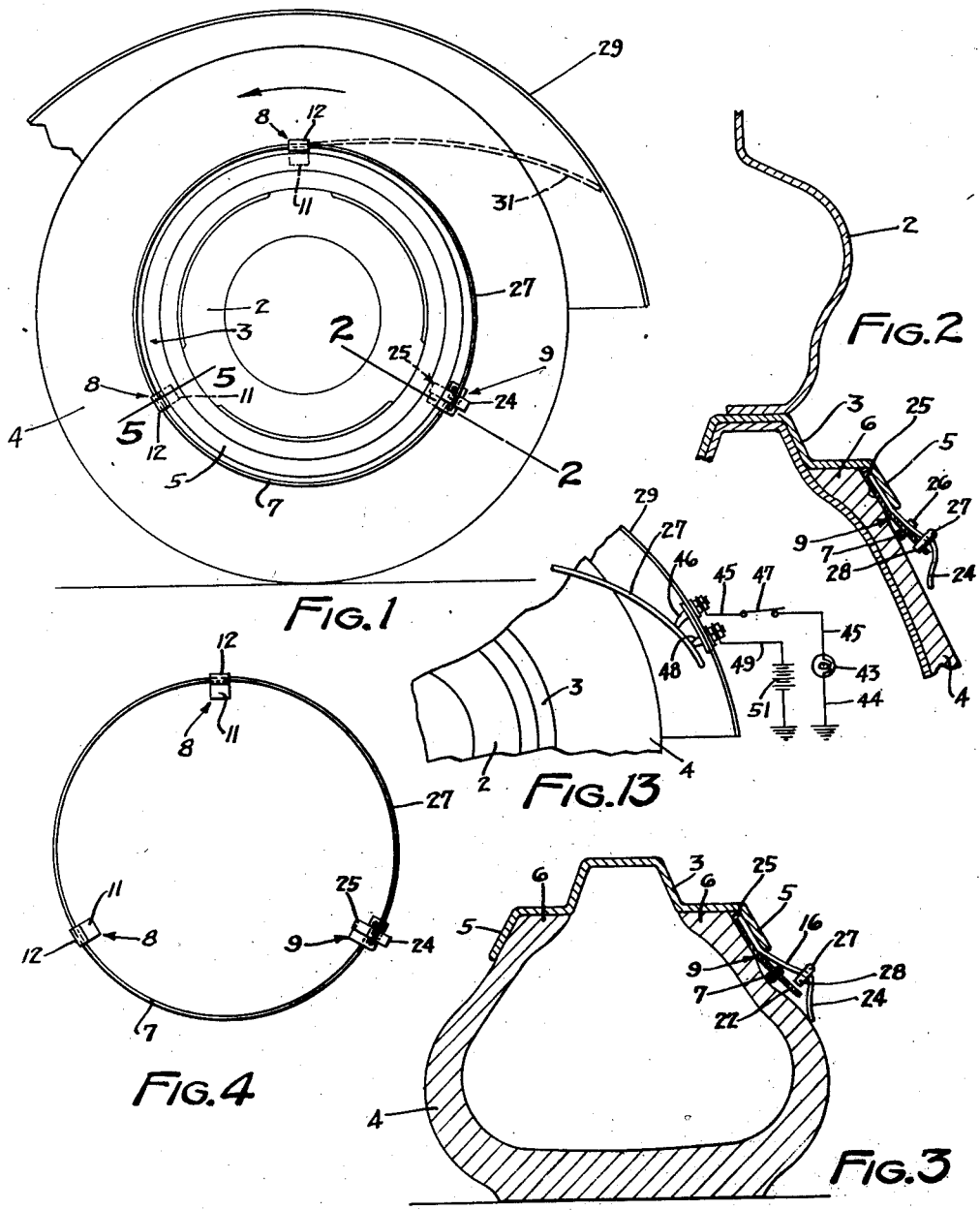

INVENTOR
LEON H. RYKKEN
By Paul, Paul & Moore
ATTORNEYS

Patented Feb. 6, 1945

2,368,617

UNITED STATES PATENT OFFICE 2,368,617

LOW-PRESSURE TIRE ALARM

Leon H. Rykken, Mayville, N. Dak.

Application April 1, 1942, Serial No. 437,189

4 Claims. (Cl. 116—34)

This invention relates to new and useful improvements in tire alarms, and more particularly to such a device adapted to produce an audible alarm when a tire becomes partially deflated, whereby the driver or occupants of the vehicle will be promptly warned, if the pressure in one or more of the vehicle tires drops to a predetermined low figure.

It is well known in the operation of automobiles, or other vehicles utilizing pneumatic tires, that the relative wear and efficiency of such tires depends largely upon the maintenance of their proper inflation at all times. In other words, to obtain the maximum wear and usefulness of a tire, the pressure thereof should be maintained at that recommended by the manufacturer, or within certain limits thereof. This is particularly true on the low side of the pressure recommended, because when the pressure in a tire decreases to the point where the tire is being constantly deformed or flexed when it engages the ground, abnormal wear is imparted to the tire casing, both as a result of the constant flexing of the casing and the increased frictional contact with the pavement, which generates heat. It is well known that excessive heat has a deteriorating effect upon rubber tires.

Numerous attempts have heretofore been made to devise attachments or devices adapted to be attached to an automobile wheel for the purpose of warning the driver or occupants of the vehicle when one or more of his tires become partially deflated. Many of these devices have been designed to be actuated by distortion of the tire at the point where it engages the ground or pavement. To the best of my knowledge none of these devices have ever proven commercially practical, some because of being too complicated and expensive, and others because of the manner of attaching them to the vehicle wheel and the mode of operation. A tire pressure warning device of this general character, to be practical, must be designed and constructed in such a manner that it may be readily attached to an automobile wheel with a minimum of labor, and also whereby it will not effect the dynamic balance of the wheel, when operating at high speed. The device must also be so constructed that it will not damage the tire when mounted on the wheel, or when it is operated by deformation of the tire as a result of low pressure. It is also of extreme importance that such a device be light in weight so as not to add excessive weight to the wheel, which might effect the balance thereof.

The present invention is the result of considerable experimental and research work in an attempt to develop a low pressure tire alarm in which all of the objectionable features now present in devices of this general type, have been eliminated, and which embodies all the desirable features required in such a device to make it commercially practical.

An important object of the present invention, therefore, is to provide an improved low pressure tire alarm which is extremely simple and inexpensive in construction, and is so constructed that it may readily be applied to conventional automobile wheels by an unskilled person in a minimum of time.

A further object is to provide a low pressure tire alarm comprising an elongated flexible striker element having one end fixed to the tire or rim, or both, and being provided with means at its opposite end for normally holding it in inoperative position, and said means being adapted to release said tension member whereby the released end or striker portion thereof may engage a fixed object such as the fender of the vehicle, and thereby produce an audible sound which may readily be heard by the operator of the vehicle to warn him that the pressure in a certain tire has dropped to a point where added air should promptly be introduced into the tire to save it from unnecessary wear and possible damage.

Other objects of the invention reside in the simple manner of mounting the invention on the wheel whereby it may be quickly attached thereto without the use of screws or separate fastening elements; in the simplified construction of the securing clips and the manner of attaching them to the arcuately formed body of the striker member, whereby said securing clips may be readily punched from stock sheet metal in quantity production at extremely low cost; in the unique manner of construction the trigger or keeper for retaining the releasable end of the striker, whereby the striker is firmly held in normal inoperative position, so long as the tire is under normal pressure, but whereby when the pressure in the tire decreases to a predetermined low pressure, the striker is immediately released to strike the fender or some other fixed object, thereby to produce an audible sound which may be readily heard by the driver of the vehicle as a warning that the pressure in one of his tires has dropped below the normal operating pressure; in the provision of a low pressure alarm for pneumatic tires which readily lends itself for mounting on conventional automobile wheels, or directly on the tire supporting rim of the wheel; and in the provision of a low pressure alarm of the character disclosed which may be manufactured from relatively light weight stock material, in quantity production at low cost, and whereby the device, when mounted on the wheel, will not affect the dynamic balance thereof, nor will it effect the general appearance of the wheel and tire.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

In the drawings:

Figure 1 is an elevational view of an automobile wheel and a portion of a fender, showing the invention attached to the wheel and showing the releasable end of the striker in normal inoperative position, the dotted lines indicating a position of the striker, when released from the keeper by actuation of the trigger;

Figure 2 is a view on the line 2—2 of Figure 1 showing only a portion of the tire, with the striker in normal inoperative position;

Figure 3 is a view showing the tire deformed as a result of low pressure, whereby the trigger is actuated to release the latter;

Figure 4 is a view showing the invention detached from the wheel;

Figure 13 is a diagrammatic view showing the invention adapted to actuate an electric signal.

Figure 5:
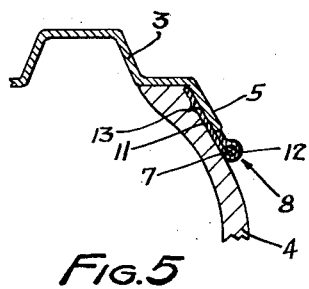
Figure 5 is a detail sectional view on the line 5—5 of Figure 1 with some of the parts omitted.

In the selected embodiment of the invention here shown, there is illustrated in Figure 1, an automobile wheel 2 provided with the usual rim 3, having a pneumatic tire 4 mounted thereon. The rim 3 is provided with the usual flanges 5 adapted to be engaged by the beads 6 of the tire, as is well known in the art.

The invention, as illustrated in Figures 1 and 4, is adapted for mounting on a conventional automobile wheel, that is, it is so constructed that it may readily be applied to a conventional wheel without the use of separable securing elements, such as screws or bolts.

In the form shown in Figures 1 and 2, the invention comprises a substantially annular member 7, preferably in the form of a small resilient wire as, for example, piano or music wire. The member 7 is detachably mounted on the wheel by means of a plurality of suitable clips, generally designated by the numeral 8, and a main supporting clip designated by the numeral 9. Each clip 8 is preferably formed of sheet metal, and comprises a flat body portion or tongue 11 having one end folded upon itself to provide a tubular sleeve 12, adapted to receive the wire member 7, as clearly illustrated in Figures 4, 5 and 6.

Figure 6:
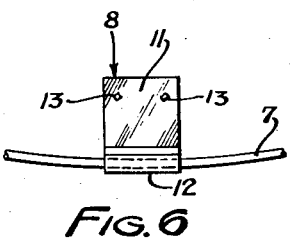
Figure 6 is an enlarged detail view showing one of the clips for securing the striker element to the wheel.

The tubular portion of the clip 8 is preferably pressed into intimate contact with the wire 7 to resist longitudinal movement thereof on the wire, although it may be rotatable thereon. Two or more spurs or prongs 13 are preferably formed in the tongue 11 adapted to engage the wall of the tire casing, shown in Figure 5, thereby to prevent accidental separation of the clip from the wheel. The tongue 11, as clearly illustrated in Figure 5, is adapted for insertion between the bead portion of the tire casing and the adjacent flange 5 of the wheel rim 3.

As shown in Figures 1 and 4, two clips 8 are preferably provided in combination with the main supporting clip 9, whereby the wire member 7 may be supported at three points around the circumference of the wheel, preferably spaced 120 degrees apart.

Figure 8:
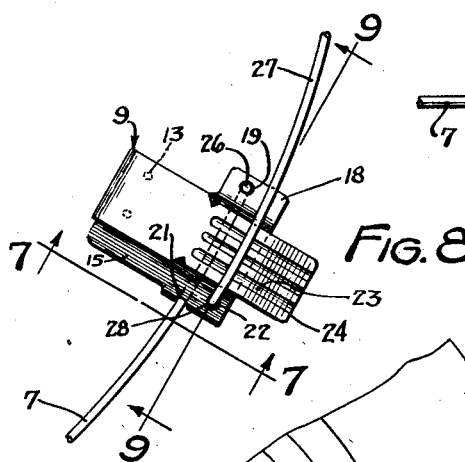
Figure 8 is a plan view of Figure 9.
Figure 9:
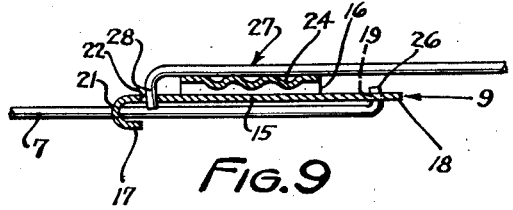
Figure 9 is a detail sectional view substantially on the line 9—9 of Figure 8, showing the parts in normal inoperative positions.
Figure 10:
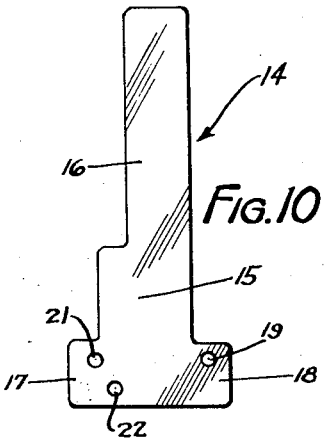
Figure 10 is a view showing the preferred contour of the blank from which the combination securing clip and trigger are formed.

The main supporting clip 9 is best shown in Figures 8, 9 and 10, and is formed from a single blank, generally designated by the numeral 14. As best shown in Figure 10, it comprises an enlarged body portion 15 having an elongated tongue 16 at one end, and provided at its opposite end with oppositely disposed lugs 17 and 18. An aperture 19 is formed in the lug 18, and a pair of spaced apertures 21 and 22 are provided in the body 15, adjacent to the lug 17. To complete the formation of the main supporting clip 9, the lug 17 is folded over the body portion 15, as shown in Figure 9, whereby the axis of the aperture 21 will be disposed substantially parallel to the plane of the body 15.

Figure 7:
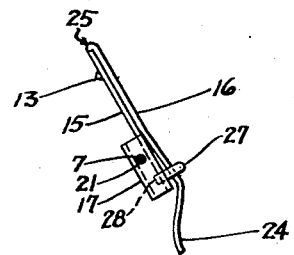
Figure 7 is an enlarged detail sectional view on the line 7—7 of Figure 8.

The tongue 16, subsequent to being longitudinally corrugated, as shown at 23 in Figure 8, is folded over the body 15 and into parallel relation therewith, as best shown in Figure 7, whereby the free end of the tongue will overhang the opposite end of the body portion 15 to provide a trigger 24. The end of the trigger 24 is offset from the plane of the tongue 16, as best shown in Figure 7, whereby it may be engaged by the wall of the casing, when the casing wall is deformed, as shown in Figure 3, as a result of engaging the ground when it contains insufficient pressure.

The tongue 16 of the blank, when folded over the body 15, as shown in Figures 7 and 8, is pressed firmly into contact with the body 15, whereby the body 15 and a portion of the tongue 16 will cooperate to provide a tongue 25, adapted to be inserted between the wall of the casing and the rim flange 5, as clearly illustrated in Figures 2 and 3.

The fixed end of the wire element 7 is anchored to the main securing clip 9 by passing it through the aperture 21, beneath the bent-over flange 17, shown in Figure 9, and inserting the hooked end portion 26 thereof into the aperture 19 in the lug 18 of the member 9. The hooked terminal 26 is preferably bent upon itself sufficiently to prevent it from becoming detached from the lug 18, as will readily be understood by reference to Figure 9.

The invention is mounted upon a wheel as hereinbefore stated, by inserting the tongues 11 of the two clips 8 and the tongue 25 of the main securing clip 9, between the tire wall and one of the rim flanges 5, as clearly illustrated in Figures 2 and 5. When thus mounted, and the tire is inflated, the tongues 11 and 25 will be securely gripped between the casing wall and rim flange, whereby they are permanently retained in position, as long as the tire is under pressure. The spurs 13 engage the casing wall to further secure the tongues 11 and 25 in place.

The releasable end portion of the wire member 7, hereinafter referred to as the striker 27, is normally retained in inoperative position, as shown in Figures 1 and 4, as result of its engagement with the aperture 22 in the main supporting clip 9. To thus secure the striker in normal inoperative position, it is provided with a terminal hook 28 adapted to be received in the aperture 22.

When thus positioned, the free end of the striker 27 will overlie the trigger 24 of the clip 9, whereby when the trigger is swung outwardly from the position shown in Figures 2 and 7, to the position shown in Figure 3, the striker is released and will whip outwardly and strike the fender 29, or some other fixed object of the vehicle, as indicated by the dotted lines 31 in Figure 1. Continued rotation of the wheel will result in the striker 31 striking the fender with each revolution of the wheel, thereby audibly warning the driver that one of his tires is partially deflated, and requires more air.

The main supporting clip 9, including the trigger 24, is preferably so shaped that after mounting on the wheel the free end of the trigger will bear the proper relation to the wall of the casing. In other words it is preferably so shaped that the terminal of the trigger will be slightly separated from the wall of the casing, when the casing is under normal pressure, thereby to prevent unnecessary release of the striker in the event the tire strikes a small object on the highway which might cause a slight deformation of the casing wall.

In the event, however, that the pressure in the tire drops sufficiently to cause the tire to deform to the point where it may become damaged, as a result of insufficient pressure, as shown in Figure 3, the wall of the tire will engage the trigger 24 and outwardly move it, whereby the striker 27 is released and will immediately become active to successively strike the fender, as hereinbefore stated. The driver's attention is thereby directed to the partially deflated condition of one of his tires, whereupon he may bring the vehicle to a stop and either introduce additional air into the partially deflated tire, or substitute another tire therefor.

Figure 11:
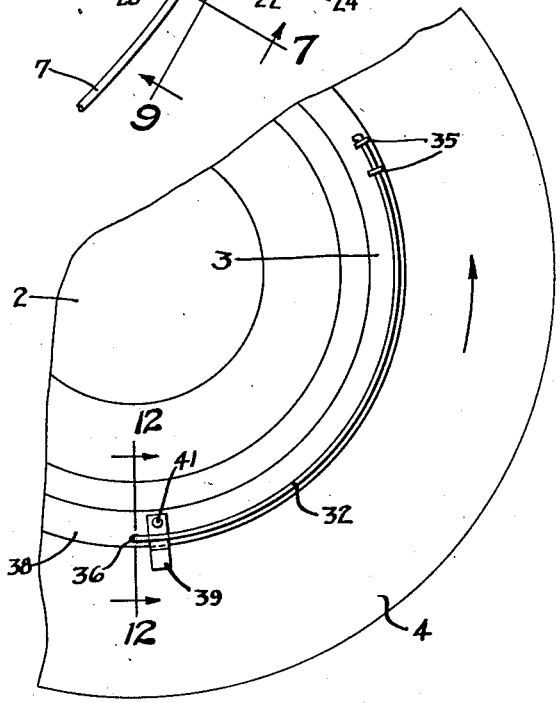
Figure 11 is a view showing an adaptation of the invention to a conventional tire supporting rim.
Figure 12:
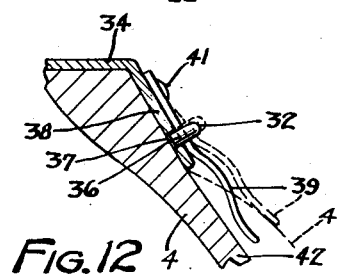
Figure 12 is an enlarged detail sectional view on the line 12—12 of Figure 11.

In Figures 11 and 12 I have shown a construction adapted to be embodied directly in the construction of a commercial tire rim. In other words the striker 32 comprises a relatively short piece of spring wire or other suitable material having one end anchored to the rim 34 of the wheel by suitable means such as lugs 35. These lugs may be formed integral with the rim, or may be otherwise permanently secured thereto. The releasable end of the striker 33 has a terminal hook 36 which is bent at right angles to the longitudinal center line of the striker, and is adapted to be normally supported in an aperture or socket 37 provided in the flange 38 of the rim 34.

A resilient trigger 39 has one end fixed to the flange 38 of the rim, as indicated at 41 in Figure 12, and its opposite flexible end is positioned in operative relationship to the wall 42 of the tire casing, whereby under normal operating conditions, as when the tire is under normal pressure, the trigger will not be actuated by the casing. Should the casing, however, become deformed as a result of insufficient pressure, as shown in Figure 3, the casing wall will engage the trigger 39 and move the hook 36 out of the aperture 37, whereby the striker is released to engage the fender or some other object, thereby to produce an audible sound in a manner similar to the construction shown in the preceding figures.

From the foregoing it will be noted that the invention herein disclosed is extremely simple and inexpensive in construction. The wire member 7 may be made from stock material and requires very little forming in that it is merely formed substantially as a circle and has its end portions provided with the terminal hooks 26 and 28. In like manner the clips 8 for securing the intermediate portion of the wire member 7 in position on the wheel, are extremely simple and inexpensive to manufacture and are made of comparatively light sheet metal. The same applies to the main securing clip 9 to which one end of the wire member 7 is permanently secured, and which also embodies the trigger 24. By securing the fixed end portion of the wire member 7 to the main securing clip 9, as shown in Figures 8 and 9, the assembling of these parts is extremely simple, and may be accomplished without additional securing elements or welding. It is to be understood, however, that the fixed end portion of the wire member 7 may be otherwise secured to the supporting clip 9, without departing from the scope of the invention.

Because of the extreme light weight of the device, as a whole, it may be mounted upon the wheel without affecting the dynamic balance thereof, which is a highly desirable and necessary feature, particularly if the vehicle is to be operated at high speed, as was common in the past. From actual experience I have found that the novel invention herein disclosed is very efficient and practical in operation. The trigger 24 may be so positioned with respect to the tire wall that the trigger is released only when the pressure in the tire drops to a predetermined figure. This may readily be accomplished by simply bending the free end of the trigger 24 to vary the spacing between it and the adjacent wall of the casing, when the tire is under normal pressure, as shown in Figure 2.

In other words if the trigger is spaced relatively closer to the casing wall than shown in Figure 2, it will obviously be actuated by less deformation of the casing wall, whereby the trigger will be released at a relatively higher minimum low pressure. On the other hand, if the spacing between the trigger and the casing wall is increased, greater deformation of the casing wall is necessary to actuate the trigger, and therefore the striker will not be released until the pressure in the tire has dropped to a lower minimum.

The invention as shown in Figure 11, adds relatively less weight to the wheel than the form shown in the preceding figures, but requires some special treatment of the automobile rim, in order to provide means for securing the striker 33 thereto.

In Figure 11 I have shown the striker mounted on the wheel for counter-clockwise rotation of the wheel. It is to be understod that the invention may be mounted on a wheel for either clockwise or counter-clockwise rotation thereof without departing from the scope of the invention.

The novel invention herein disclosed has met with approval by the automobile driving public, as it serves to conserve tires by promptly warning the driver or occupants of a vehicle so equipped, when one or more the tires thereof may have become partially deflated and require additional air.

To obtain maximum wear and efficiency from pneumatic tires, it is of utmost importance that the pressure therein be maintained at substantially the figure recommended by the manufacturers. It is difficult at times to readily detect from the driver's seat of an automobile, when the pressure in a tire drops to a point where the walls of the tire casing are being partially deformed, as the wheel rolls over the pavement. This is particularly true of the rear wheels of the vehicle. With the novel invention herein disclosed, this danger is completely eliminated, in that the driver of the vehicle is immediately warned when one or more of the tires requires attention because of lack of sufficient pressure.

In Figure 13 I have shown a construction wherein the striker 31 is adapted to actuate an electrically operated signal, as indicated at 43, which may be in the form of a light-bulb, or any other visual or audible signal applicable for the purpose. As shown in Figure 13, the signal 43 has a wire 44 connecting it to a suitable ground, and a wire 45 connecting it to a contact 46, shown mounted in the wall of the fender 29. A switch 47 is preferably interposed in the wire 45 whereby the warning or signal circuit may be rendered inoperative, should the driver so desire. A complemental contact 48 is mounted adjacent to the contact 46 in insulated relation thereto, and is shown having a wire 49 connecting it to a source of electric energy such as the visual battery 51 of the automobile or vehicle. The contacts 46 and 48 are of course insulated from the fender 29, as will be understood.

In the operation of the device shown in Figure 13, each time the striker 21 bridges the contacts 46 and 48, as shown, the warning circuit is temporarily closed, whereby the signal 43 will be intermittently actuated so long as the wheel continues to rotate or until the traveling movement of the vehicle is substantially interrupted.

The disclosure in Figure 13 is merely illustrative of how the invention may be utilized to operate an electrically actuated warning signal. By such an arrangement, the driver of an automobile towing a trailer may be warned if one of the tires of the trailer should become partially or wholly deflated. When used in connection with a trailer, the signal 43 is preferably mounted on the instrument board of the vehicle, and wires electrically connect it to the contacts 44 and 48, which would be mounted on a fixed portion of the trailer in position to be engaged by one of the strikers 31 carried by the trailer wheel. The switch 47 may be mounted on the instrument board within convenient reach of the driver.

While I have herein shown the contacts 44 and 48 as being mounted on a fender of the automobile or trailer, it is to be understood that they may be otherwise arranged and supported without departing from the scope of the invention, provided they are so arranged that release of a striker 31 will cause a circuit to be intermittently closed between said contacts.

It will be apparent to those skilled in the art that I have accomplished at least the principal objects of my invention, and it will also be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that my invention is not limited thereto.

I claim as my invention:

1. The combination with a vehicle having a wheel rim provided with a pneumatic tire, of a low pressure alarm mounted on the rim and comprising an elongated, resilient striker having one end secured to the rim, means normally retaining the opposite end of the striker in inoperative position substantially within the confines of the rim, and trigger means associated with said retaining means and adapted to be actuated by the tire wall, when the tire unduly flexes as result of insufficient pressure, thereby to cause the release of the striker whereby the striker may intermittently strike a fixed portion of the vehicle and thereby produce an audible alarm.

2. The combination with a vehicle having a wheel rim provided with a pneumatic tire, of a warning device comprising an elongated wire-like striker, means for anchoring one end of the striker to the rim, and trigger means for normally releasably supporting the other end of the striker, said trigger means having a portion positioned adjacent to the wall of the tire, whereby when the tire unduly flexes as a result of insufficient pressure, said trigger means is actuated by the tire wall and thereby causes the release of the striker, whereby the striker may intermittently engage a fixed portion of the vehicle and thereby produce an audible signal.

3. The combination with a vehicle having a wheel rim provided with a pneumatic tire, of a warning device comprising a resilient striker which is relatively straight when in normal condition, means for anchoring one end of the striker in fixed relation to the rim, means on the rim remote from said anchoring means adapted to be engaged by the opposite end of the striker to releasably retain the striker in inoperative position in close contact with the rim the length thereof, and a yieldable trigger adjacent to the releasable end of the striker, said trigger having a portion positioned to be engaged by the tire wall, when the tire wall is unduly flexed as result of insufficient pressure in the tire, whereby said trigger is actuated to cause the release of the striker and whereby the striker may intermittently impinge against a fixed portion of the vehicle, and thereby produce an audible signal.

4. The combination with a vehicle having a wheel rim provided with a pneumatic tire, of a warning device mounted on the rim and comprising an elongated, wire-like striker having a releasable end, a metallic clip for anchoring the opposite end of the striker to the rim, retaining means for normally holding the releasable end of the striker in inoperative position, said striker normally being in the form of a straight wire which is bent to conform to the configuration of the wheel rim, when the releasable end of the striker is secured by the retaining means, and trigger means associated with the retaining means and adapted to be engaged by the tire wall, when the tire is partially deflated, thereby to actuate the retaining means and cause the release of the striker, whereby the striker may engage a fixed portion of the vehicle and produce an audible signal.

LEON H. RYKKEN.